(12) United States Patent
Rottmann

(10) Patent No.: US 10,106,104 B2
(45) Date of Patent: Oct. 23, 2018

(54) DECORATIVE ELEMENT FOR AN INTERIOR OF A MOTOR VEHICLE, DEVICE FOR AN INTERIOR OF A MOTOR VEHICLE, MOTOR VEHICLE, AND METHOD FOR PRODUCING A DECORATIVE ELEMENT

(71) Applicant: Volkswagen Aktiengesellschaft, Wolfsburg (DE)

(72) Inventor: Johannes Rottmann, Suepplingenburg (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 17 days.

(21) Appl. No.: 15/397,152

(22) Filed: Jan. 3, 2017

(65) Prior Publication Data
US 2017/0113630 A1    Apr. 27, 2017

Related U.S. Application Data

(63) Continuation of application No. PCT/EP2015/064736, filed on Jun. 29, 2015.

(30) Foreign Application Priority Data

Jul. 3, 2014  (DE) .................. 10 2014 212 979
Sep. 22, 2014  (DE) .................. 10 2014 219 074

(51) Int. Cl.
*B60R 13/00* (2006.01)
*B60R 13/02* (2006.01)
*B60Q 3/20* (2017.01)

(52) U.S. Cl.
CPC ............ *B60R 13/0262* (2013.01); *B60Q 3/20* (2017.02); *B60Q 2500/10* (2013.01);
(Continued)

(58) Field of Classification Search
CPC .......... A01G 5/04; Y10S 362/806; F21S 4/10; A45D 2008/006; G09F 3/10; B29C 66/71;
(Continued)

(56) References Cited

U.S. PATENT DOCUMENTS 6,601,247 B2 * 8/2003 Shimizu .................. A47K 3/02
4/538
9,493,124 B2  11/2016 Vasilj et al.
(Continued)

FOREIGN PATENT DOCUMENTS

DE    298 08 949 U1    7/1998
DE    103 46 219 A1    4/2005
(Continued)

*Primary Examiner* — Kiran B Patel
(74) *Attorney, Agent, or Firm* — Muncy, Geissler, Olds & Lowe, P.C.

(57) ABSTRACT

A decorative element for an interior of a motor vehicle having a visible side facing the interior. The visible side has a first glossy surface region. The visible side has a second matte surface region. A device is also provided for an interior of a motor vehicle having such a decorative element and at least one lighting element, wherein when the device is arranged in a motor vehicle as intended, the second surface region is arranged in such a way that a reflection condition between a light beam coming from the lighting element and a line of vision of a passenger of the motor vehicle is geometrically fulfilled, wherein the first surface region of the decorative element is arranged in such a way that no reflection condition between a light beam coming from the lighting element and the line of vision is geometrically fulfilled.

7 Claims, 2 Drawing Sheets

(52) U.S. Cl.
CPC ....... *B60R 13/0243* (2013.01); *B60R 13/0256* (2013.01); *B60R 2013/0287* (2013.01)

(58) Field of Classification Search
CPC ... B32B 27/08; B32B 27/304; A47G 33/0863; A47K 3/001
USPC ..................................................... 296/24.34
See application file for complete search history.

(56) References Cited

U.S. PATENT DOCUMENTS

| | | |
|---|---|---|
| 2005/0064141 A1 | 3/2005 | Flaig et al. |
| 2007/0041204 A1* | 2/2007 | Wahara ..................... B60R 7/06 362/459 |
| 2017/0113516 A1* | 4/2017 | Rottmann ............ B60H 1/3421 |

FOREIGN PATENT DOCUMENTS

| | | |
|---|---|---|
| DE | 10 2007 009 384 A1 | 8/2008 |
| DE | 10 2008 057 332 A1 | 5/2010 |
| DE | 10 2009 034 944 A1 | 2/2011 |
| DE | 10 2010 017 494 A1 | 12/2011 |
| DE | 10 2008 037 131 B4 | 3/2013 |
| DE | 10 2012 105 412 A1 | 12/2013 |
| DE | 10 2012 015 057 A1 | 1/2014 |
| DE | 10 2012 023 066 A1 | 5/2014 |
| EP | 1 203 652 B1 | 12/2003 |
| FR | 2 937 603 A1 | 4/2010 |
| JP | 2001-276725 A | 10/2001 |
| JP | 2002 018893 A | 1/2002 |
| JP | 2005-146179 A | 6/2005 |
| JP | 2007-022200 A | 2/2007 |
| WO | WO 2011/088995 A1 | 7/2011 |

\* cited by examiner

DECORATIVE ELEMENT FOR AN INTERIOR OF A MOTOR VEHICLE, DEVICE FOR AN INTERIOR OF A MOTOR VEHICLE, MOTOR VEHICLE, AND METHOD FOR PRODUCING A DECORATIVE ELEMENT

This nonprovisional application is a continuation of International Application No. PCT/EP2015/064736, which was filed on Jun. 29, 2015, and which claims priority to German Patent Application No. 10 2014 212 979.6, which was filed in Germany on Jul. 3, 2014, and German Patent Application No. 10 2014 219 074.6, which was filed in Germany on Sep. 22, 2014, which are herein incorporated by reference.

BACKGROUND OF THE INVENTION

Field of the Invention

The invention relates to a decorative element for an interior of a vehicle, for example a motor vehicle, a device for an interior of a motor vehicle, a motor vehicle, and a method for producing a decorative element for an interior of a motor vehicle.

Description of the Background Art

A decorative element of the kind addressed here in the mounted state has a visible side facing the interior of a motor vehicle. For example, decorative elements are known, which have a visible side produced in an in-mold-decoration process (IMD process) or in an in-mold-labeling process (IML process), whereby such decorative elements are also called an IMD decorative element or an IML decorative element. It is evident here that for aesthetic considerations such decorative elements have a high degree of gloss on their visible side, so that they are formed as glossy and in particular as reflective. Decorative elements are also known whose visible side is formed matte overall, but this is often not preferable for the above-mentioned aesthetic considerations. Unwanted reflective effects can occur due to the high degree of gloss of the visible side. If the decorative element is arranged relative to a lighting element, for example, an illuminating functional element, in particular a display element or control element, so that the light beams coming from the lighting element are reflected on the visible side into the eye of a driver, this can be disruptive, on the one hand, and possibly lead to misreadings of the display element, on the other. Attempts can be made to arrange a decorative element with a high-gloss visible side in such a way in a motor vehicle interior that reflections of the lighting element can longer reach the viewer. This nevertheless results in a very limited freedom of choice in the design of the interior, so that compromises in the aesthetic design are possibly necessary and/or space problems arise.

SUMMARY OF THE INVENTION

It is therefore an object of the invention to provide a decorative element which does not have the aforementioned disadvantages. Further, it is an object of the invention to provide a device for an interior of a motor vehicle, a motor vehicle, and a method for producing a decorative element in which the aforementioned disadvantages also do not occur.

In an exemplary embodiment, the decorate element has a visible side that has a first glossy surface region, whereby it simultaneously has a second matte surface region, and therefore it is possible to eliminate disturbing reflective effects in the motor vehicle interior by providing the second matte surface region where such reflective effects are to be expected. The decorative element can be mounted flexibly and is not limited in its use to specific angular positions during installation. No design and/or space problems arise as a result. It is possible that the visible side has more than one first glossy surface region. Alternatively or in addition, it is possible that the visible side has more than one second matte surface region. In particular, a number of second matte surface regions can be distributed as needed on the visible side, in particular, namely, at places where disturbing reflective effects are to be expected.

The decorative element can be provided for the interior of a passenger vehicle.

It is possible in an IMD or IML process to position a film provided for producing the visible side only in areas in a region of the visible side to be formed, which is later to be made glossy, whereby the rest of the surface region of the visible side is formed by a plastic substrate used in the method and thus is at least less glossy, preferably matte. In this case, the visible side is not formed in a homogeneous method but is formed more or less in some areas in an IMD or IML process and in some areas in a strictly plastic-injection molding process. The result is that the surface in a first region is coated by a film color, whereby in a second region it has the coloring and optical properties of the plastic substrate. In this regard, two optically different surface regions arise, which differ in particular in their coloring and/or in their patterning. Furthermore, a "step" due to the mold parting line forms in the area of the visible side.

The visible side in an exemplary embodiment is formed by a homogeneous process, as a result of which, except for differences in the degree of gloss, it can have similar optical properties and in particular a similar color in all surface regions. Moreover, a mold parting line and thereby a step in the area of the visible side are prevented.

The visible side can be formed by a homogeneous process along its entire expanse. This means that the entire visible side is formed by the same production process, no different processes in particular being used for the first surface region and the second surface region. For example, the visible side can be produced overall in an IMD process or in an IML process. The phrasing selected here that the visible side is made by a homogeneous process therefore means that the visible side is made overall by one and the same uniform process, whereby this feature moreover is not limiting in significance. In particular, no conditions beyond this are imposed on the homogeneity of the process.

An embodiment of the invention provides that the first and second surface region have a similar color. For example, the first and second surface region can have the same color. The first surface region and second surface region then advantageously differ in fact solely in their degree of gloss, so that there is an otherwise continuous, very aesthetic visual appearance of the visible side without any visual or actual steps.

An embodiment of the invention provides that the first surface region and the second surface region together enclose an angle that is different from 180°. The two surface regions are therefore in particular not oriented parallel to one another. It is possible accordingly that light beams, coming from a lighting element, geometrically fulfill a reflection condition with a line of vision of a vehicle occupant on the second surface region, whereby they simultaneously do not fulfill any reflection condition with the occupant's line of vision on the first surface region. Accordingly, a disturbing reflective effect is likely only with regard to the second surface region, whereby here the reflective effect is prevented by making the second surface region matte. Therefore, it has scattering properties instead of reflective properties, so that despite the geometrically fulfilled reflection condition, in each case no disturbing light intensity coming from the lighting element and conveyed via the second surface region can reach in the occupant's eye. Because no reflection condition is fulfilled by the first surface region, it can be made glossy without disturbing reflective effects occurring. Preferably, the two surface regions together enclose an angle of at least 30° to at most 100°, preferably of at least 40° to at most 90°, preferably of at least 50° to at most 80°, preferably of 70°.

An embodiment of the invention provides that the decorative element in the second surface region can have a surface structure whose roughness is greater than a roughness of a surface structure in the first surface region. As a result, the second surface region can be made matte in an especially simple and economic manner, whereby the first surface region can be made glossy. In particular, the second surface region is preferably roughened in comparison with the first surface region. Preferably, the second surface region has a grain due to which it has an increased roughness.

An embodiment of the invention provides that the visible side can be produced by an IMD process. Within the scope of such a process, a film is placed in a mold cavity, particularly preferably rolled as a film strip perpendicularly through the cavity with the aid of a drive. In this case, the film is provided with a pattern to be transferred or a color to be transferred. It is possible that individual images are positioned on the film by sensors. The pattern or the color points in the direction of an opening of the mold. The mold is filled with plastic; in particular plastic is injected as part of the injection molding process. Alternatively, however, thermoforming is also possible. Whereas the cavity of the mold is filled with plastic, the color adheres to the resulting cast part or molded part and is loosened from the film typically during opening of the mold, therefore during the demolding of the finished part. The coated part can now be removed. It is also possible alternatively, however, that a single film is used, which is joined to the forming part and remains on it. In this case, the visible side of an arising decorative element is formed not by the color detached from the film but rather by the film itself.

Alternatively or addition, it is possible that the visible side is made by an IML process. In this case, the IML process differs from an IMD process typically in that in the IML process separate films are placed in the mold, whereby in the IMD process typically a film strip is rolled perpendicularly through the mold cavity with the aid of a drive. This distinction is not absolute, however, and the both terms are used with some overlapping. In each case, both processes, also as differentiated from each other, are suitable for producing the decorative element proposed here and represent especially favorable and simple processes for producing the decorative element.

An embodiment of the invention provides that the decorative element is formed as a cover for a center console or an instrument panel or a headliner or a door panel or a side panel of a motor vehicle. It is possible in particular in this case that it is placed above an illuminating display element and/or control element, so that the advantages of the decorative element are realized to the full extent.

The object is also achieved by providing a device for an interior of a motor vehicle. The device has at least one lighting element. In this case, a lighting element is preferably understood to be a functional element illuminating during the operation of the motor vehicle, in particular a display element and/or an operating element which is made in particular self-illuminating, and therefore emits light. This can be, for example, a temperature display of an automatic climate control system, an internal temperature display or an external temperature display, or a control knob, for example, of a climate control unit. The device is characterized by a decorative element according to one of the above-described embodiments, whereby when the device is arranged in a motor vehicle as intended, the second surface region of the decorative element is arranged so that a reflection condition between a light beam, coming from the lighting element, and a line of vision of a vehicle occupant is geometrically fulfilled, and whereby the first surface region of the decorative element is arranged so that here no reflection condition between a light beam, coming from the lighting element, and an occupant's line of vision is geometrically fulfilled. The advantages, already described in regard to the decorative element, are realized in connection with the device.

In particular, no unwanted reflective effects can occur in the area of the first surface region, because here no reflection condition between a light beam, coming from the lighting element, and an occupant's line of vision is fulfilled. Such unwanted reflective effects could occur at most in the second surface region, because here at least one such reflection condition is geometrically fulfilled. Because the second surface region is made matte, however, and has scattering properties, nevertheless, no relevant reflection occurs here as well, so that in this area as well unwanted reflective effects are prevented.

The device can be made as a control device for the motor vehicle, in particular as a control device integrated into a center console or an instrument panel or a headliner or a door panel or a side panel, or as a center console of a motor vehicle. Particularly preferably, the device is made as a control device for a passenger vehicle.

The reflection condition can be determined with regard to a line of vision of a driver of the motor vehicle, because disturbing a driver by unwanted reflective effects is prevented with particular advantage.

For example, the first surface region of the decorative element when the device is arranged in the motor vehicle as intended is arranged so that it can be lit at most indirectly by the lighting element. A light beam, coming from the lighting element, therefore, does not strike the first surface region directly and can therefore also not be reflected by it into an occupant's eye. In particular, preferably a light beam coming from the lighting element is not deflected from the first surface region in the direction of the occupant, in particular in the direction of the occupant's line of vision. In contrast, this would be the case with the second surface region, if it were glossy or would have reflective properties. Because it is made matte, however, here as well reflections and thereby unwanted reflective properties are prevented.

The object is also achieved by providing a motor vehicle. The motor vehicle includes a device according to one of the above-described embodiments. The device in this case can be arranged in the above-described manner as intended in the motor vehicle. Thus, the advantages, already explained in connection with the decorative element and the device, are realized for the motor vehicle.

An embodiment of the invention provides that the motor vehicle is made as a passenger vehicle. In particular, preferably the device is made as a control device, and very particularly preferably as a control device of a center console or an instrument panel or a headliner or a door panel or a side panel, or as a center console of the motor vehicle and in particular of the passenger vehicle.

The object is also achieved by providing a method for producing a decorative element. The method is used for producing a decorative element according to one of the above-described embodiments and includes the following steps: A mold cavity is provided, which has a molding surface which forms a visible side of the decorative element. The molding surface has a low roughness in a first area, whereby it has a greater roughness in a second area. The roughness of the molding surface is therefore lower in the first area than in the second area. At least one plastic is introduced into the mold cavity. The visible side is formed in this manner in the area of the molding surface, whereby the increased roughness in the second region is transferred to the visible side. In this regard, in particular the first surface region of the visible side is formed by the first area of the molding surface, whereby the second surface region of the visible side is formed by the second area of the molding surface. The decorative element is very simple to produce with the aid of the method, whereby the advantages, already explained in connection with the decorative element, the device, and the motor vehicle, are realized.

Preferably a mold cavity is used whose molding surface is partially structured. In this case, the molding surface is structured particularly in the second region. In particular, a molding surface that has a grain in areas is used with preference. In particular, the molding surface has a grain in the second region.

The plastic can be injected into the mold cavity. In this case, an injection molding process is used for producing the decorative element. Alternatively, it is possible that a thermoforming process is used for producing the decorative element.

After the plastic solidifies in the mold cavity, the cavity is preferably opened, and the finished decorative element is removed from the mold cavity. One decorative element overall is obtained in this manner.

A refinement of the invention provides that a film is placed on the molding surface before the plastic is introduced into the mold cavity. Within the scope of the method, the increased roughness in the second region of the molding surface is then transferred to the film, as a result of which it is then finally also transferred to the formed visible side. An IMD process or an IML process in particular is used preferentially.

The description of the decorative element, the device, and the motor vehicle, on the one hand, and the method, on the other, are to be understood as complementary to one another. In particular process steps, described explicitly or implicitly in connection with the decorative element, the device, or the motor vehicle, are preferably individual or combined process steps of a preferred embodiment of the method. Features of the decorative element, the device, or the motor vehicle, which were described explicitly or implicitly in connection with the method, are preferably individual or combined features of a preferred exemplary embodiment of the decorative element, the device, or the motor vehicle. The method is characterized preferably by at least one process step, which is determined by at least one feature of the decorative element, the device, or the motor vehicle. The decorative element, the device, and/or motor vehicle are characterized preferably by at least one feature, which is determined by at least one process step of the method.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
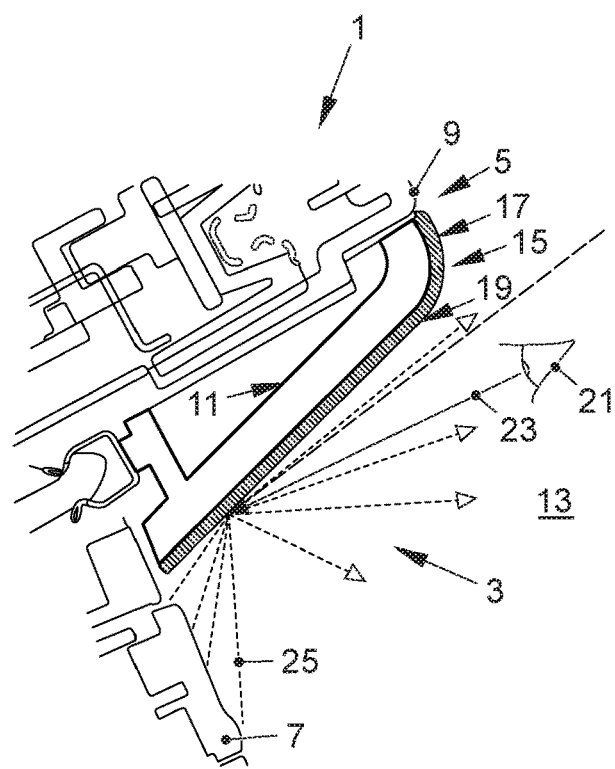
FIG. 1 shows a schematic illustration of a motor vehicle with a device according to the conventional art.

FIG. 1 shows a schematic illustration of a motor vehicle 1 with a device 3, which is located here on a center console 5. Device 3 has a lighting element 7, which is made here as a control element or display element of an automatic climate control system. A decorative element 11, which is formed as a cover for center console 5, is arranged between a display device 9 and lighting element 7 in the vertical direction of motor vehicle 1. Decorative element 11 has a visible side 15 which faces an interior 13 of the motor vehicle and is produced here along its entire expanse by a homogeneous method, for example, by an IMD process or an IML process. Visible side 15 has a first surface region 17 and a second surface region 19, whereby first surface region 17 encloses an angle with second surface region 19. Visible side 15 is formed homogeneously highly glossy throughout, whereby there is no optical difference between first surface region 17 and second surface region 19.

An eye 21 of an occupant of motor vehicle 1, in particular eye 21 of the driver is shown schematically, whereby a line of vision of the occupant, in particular of the driver, is shown as a solid arrow 23. It is now apparent that light beams, which come from lighting element 7 and are shown here by broken arrows, of which for the sake of better clarity only one is labeled with the reference number 25, are reflected on second surface region 19 and deflected at least partially in the direction of line of vision 23. Therefore, there are a plurality of light beams 25 for which a reflection condition with line of vision 23 is fulfilled. Of course, these reflection conditions exist not only at the point emphasized in FIG. 1, but at a plurality of points distributed over second surface region 19. For this reason, disturbing reflective effects of lighting element 7 enter eye 21 of the occupant, which can lead to irritations and/or to misreadings of lighting element 7. First surface region 17, in contrast, is not lit directly by lighting element 7, whereby accordingly such reflection conditions are also not fulfilled here.

Figure 2:
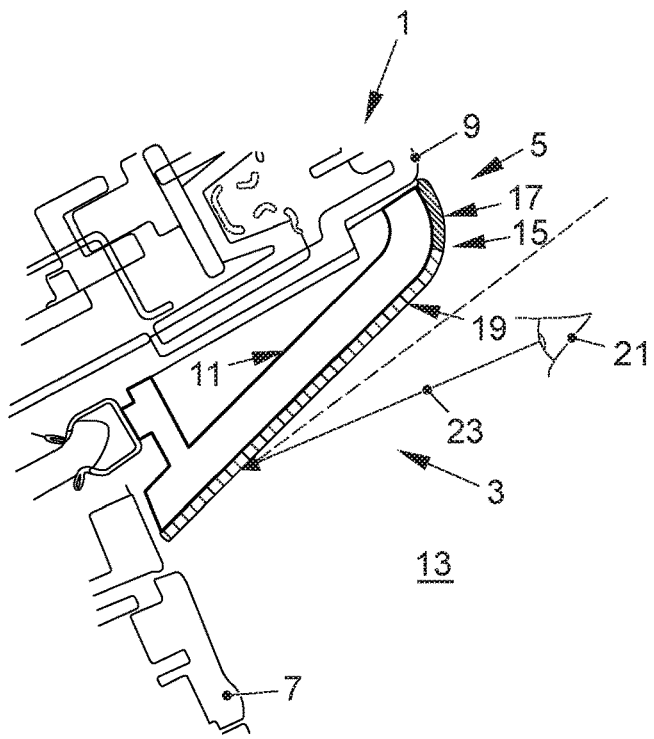
FIG. 2 shows a schematic illustration of a motor vehicle of the invention with a device of the invention and a decorative element of the invention.

FIG. 2 shows a schematic illustration of an exemplary embodiment of a motor vehicle 1 with a device 3 and a decorative element 11 according to the invention. Similar and functionally equivalent elements are provided with the same reference numbers, so that in this respect reference is made to the previous description. In the illustrated exemplary embodiment, visible side 15 is made by a homogeneous method, preferably by an IML process or an IMD process. Particularly preferably, the entire decorative element 11 is made in an IMD process or an IML process. First surface region 17 here, as already explained in connection with FIG. 1, is made glossy, whereby in contrast to decorative element 11 according to FIG. 1, second surface region 19 is made matte here in the exemplary embodiment of the invention. In particular, second surface region 19 preferably has a surface structure whose roughness is greater than the roughness of a surface structure in first surface region 17. Because second surface region 19 has matte optical properties or scattering properties, unwanted reflective effects in eye 21 are prevented, even when or although a reflection condition between at least one light beam, coming from lighting element 7, and line of vision 23 is geometrically fulfilled. In contrast, unwanted reflective effects in first surface region 17 are not likely, because here no reflection condition of the aforementioned type is geometrically fulfilled. It is easily possible therefore to design first surface region 17 as glossy.

At the same time, first surface region 17 and second surface region 19 can correspond in all other optical properties, in particular have a similar or the same color. In this case, an visual separation of the two regions is largely avoided, whereby moreover due to the homogeneous production process no mold parting line and in particular no step occur in the area of front side 15 and thereby in a grip region of decorative element 11.

Decorative element 11 is characterized by a high design freedom or design consistency, in particular because there are no special conditions for an installation position for decorative element 11. It can have a continuous, homogeneous shade and/or be provided with a continuous, uniform pattern, whereby the shade and/or the pattern can extend over the entire visible side 15.

Second surface region 19 is only made matte in comparison with first surface region 17, whereby gloss is avoided here. This is possible without a change in color, however. The matte second surface region 19 is preferably produced by graining in a mold for producing decorative element 11. A grainy transition region, in which the grain is gradually phased out in order to produce a visually and haptically especially harmonic transition profile, is located advantageously in a transition zone between a second grainy surface region 19 and a first glossy surface region 17.

Figure 3:
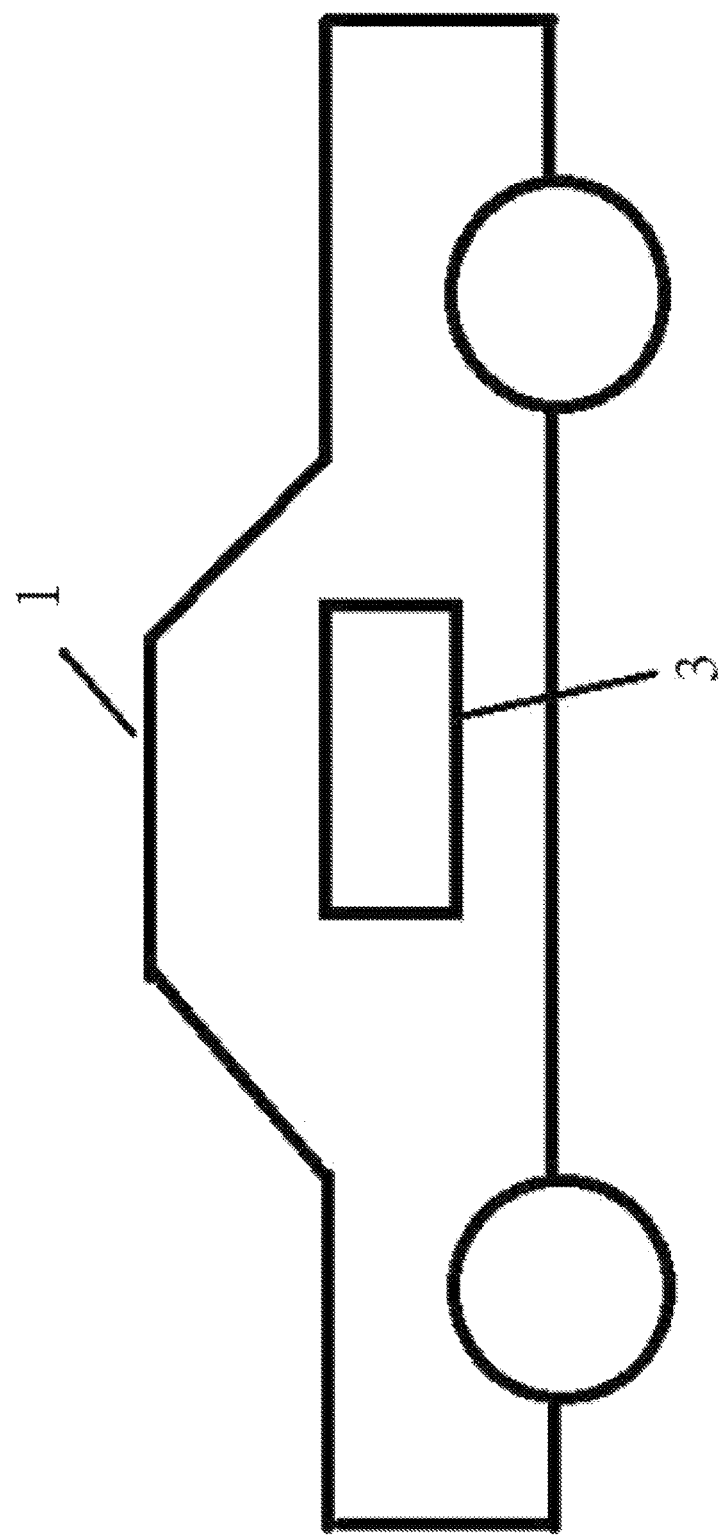
FIG. 3 shows a schematic illustration of a motor vehicle.

It is apparent overall, with reference to FIG. 3, that with the aid of decorative element 11, device 3, motor vehicle 1, and the method for producing decorative element 11, unwanted reflective effects in eye 21 of an occupant, in particular of the driver, can be effectively prevented, without aesthetic compromises having to be made for this reason or space problems resulting.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for an interior of a motor vehicle comprising:
at least one lighting element; and
a decorative element, the decorative element comprising a visible side facing the interior of the motor vehicle when the device is arranged in the motor vehicle, the visible side having at least one glossy surface region and having at least one matte surface region,
wherein, when the device is arranged in the motor vehicle, the at least one matte surface region is arranged so that a reflection condition between a light beam coming from the at least one lighting element and a line of vision of a passenger of the vehicle is geometrically fulfilled, and
wherein the at least one glossy surface region of the decorative element is arranged so that no reflection condition between the light beam coming from the lighting element and the line of vision is geometrically fulfilled.

2. A motor vehicle comprising the device according to claim 1.

3. The device according to claim 1, wherein the at least one glossy surface region and the at least one matte surface region have a similar color.

4. The device according to claim 1, wherein the at least one glossy surface region and the at least one matte surface region together enclose an angle that is different from 180°.

5. The device according to claim 1, wherein the at least one matte surface region has a surface whose roughness is greater than a roughness of a surface of the at least one glossy surface region.

6. The device according to claim 1, wherein the decorative element is formed as a cover for a center console of the motor vehicle.

7. The device according to claim 1, wherein the decorative element is formed as an instrument panel or a headliner or a door panel or a side panel of the motor vehicle.

* * * * *